United States Patent
Kang et al.

(10) Patent No.: US 11,765,744 B2
(45) Date of Patent: *Sep. 19, 2023

(54) METHOD FOR CELL CYCLIC DOWNLINK TRANSMISSION IN WIRELESS COMMUNICATION SYSTEM AND APPARATUS THEREFOR

(71) Applicant: LG ELECTRONICS INC., Seoul (KR)

(72) Inventors: Jiwon Kang, Seoul (KR); Heejeong Cho, Seoul (KR); Genebeck Hahn, Seoul (KR); Ilmu Byun, Seoul (KR); Heejin Kim, Seoul (KR); Hyunjin Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/684,917

(22) Filed: Mar. 2, 2022

(65) Prior Publication Data

US 2022/0191843 A1    Jun. 16, 2022

Related U.S. Application Data

(63) Continuation of application No. 16/088,525, filed as application No. PCT/KR2016/011670 on Oct. 18, 2016, now Pat. No. 11,304,184.

(Continued)

(51) Int. Cl.
*H04W 72/23*    (2023.01)
*H04L 5/00*    (2006.01)

(52) U.S. Cl.
CPC .......... *H04W 72/23* (2023.01); *H04L 5/0048* (2013.01); *H04L 5/0053* (2013.01)

(58) Field of Classification Search
None
See application file for complete search history.

(56) References Cited

U.S. PATENT DOCUMENTS 9,867,120 B2    1/2018  Ng et al.
2010/0202395 A1    8/2010  Lee et al.
(Continued)

FOREIGN PATENT DOCUMENTS

CA    2889323    5/2014
EP    2728787    5/2014
(Continued)

OTHER PUBLICATIONS

European Patent Office Application Serial No. 16898041.5, Partial Search Report dated Sep. 19, 2019, 13 pages.

(Continued)

*Primary Examiner* — Saumit Shah
(74) *Attorney, Agent, or Firm* — LEE HONG DEGERMAN KANG WAIMEY

(57) ABSTRACT

The present application provides a method for receiving a downlink signal by a terminal in a wireless communication system. Specifically, the method comprises the steps of: receiving a downlink control signal, a first downlink data signal, a first downlink demodulation reference signal for the first downlink data signal in a first time unit; and receiving a second downlink data signal and a second downlink demodulation reference signal for the second downlink data signal in a second time unit, wherein the downlink control signal includes information on a first antenna port for a reference signal, the first antenna port being quasi-co-located (QCL) with an antenna port for the first downlink demodulation reference signal, and information on a second antenna port for a reference signal, the second antenna port being quasi-co-located (QCL) with an (Continued)

antenna port for the second downlink demodulation reference signal.

20 Claims, 11 Drawing Sheets

Related U.S. Application Data

(60) Provisional application No. 62/319,301, filed on Apr. 7, 2016.

(56) References Cited

U.S. PATENT DOCUMENTS

| | | |
|---|---|---|
| 2012/0127938 A1 | 5/2012 | Lv et al. |
| 2012/0188978 A1 | 7/2012 | Yan et al. |
| 2013/0028134 A1 | 1/2013 | Wang et al. |
| 2013/0208678 A1 | 8/2013 | Zhang |
| 2013/0329711 A1 | 12/2013 | Seo et al. |
| 2014/0146689 A1 | 5/2014 | Gaur et al. |
| 2014/0177607 A1 | 6/2014 | Li et al. |
| 2014/0192734 A1 | 7/2014 | Ng et al. |
| 2014/0335876 A1 | 11/2014 | Ratasuk et al. |
| 2015/0139175 A1 | 5/2015 | Ratasuk et al. |
| 2016/0255648 A1* | 9/2016 | Frenne ............... H04L 5/0048 370/329 |
| 2018/0219605 A1 | 8/2018 | Davydov et al. |
| 2018/0310283 A1 | 10/2018 | Deenoo et al. |
| 2019/0021076 A1 | 1/2019 | Zhang et al. |
| 2020/0305130 A1 | 9/2020 | Kang et al. |

FOREIGN PATENT DOCUMENTS

| | | |
|---|---|---|
| EP | 2892169 | 7/2015 |
| EP | 2905909 | 8/2015 |
| WO | 2013012151 | 1/2013 |

OTHER PUBLICATIONS

United States Patent and Trademark Office U.S. Appl. No. 16/088,525, Office Action dated Nov. 24, 2020, 24 pages.
United States Patent and Trademark Office U.S. Appl. No. 16/088,525, Final Office Action dated Mar. 24, 2021, 24 pages.
United States Patent and Trademark Office U.S. Appl. No. 16/088,525, Office Action dated Aug. 12, 2021, 24 pages.
United States Patent and Trademark Office U.S. Appl. No. 16/088,525, Notice of Allowance dated Dec. 21, 2021, 24 pages.
European Patent Office Application Serial No. 22156317.4, Search Report dated Jun. 7, 2022, 8 pages.
PCT International Application No. PCT/KR2016/011670, Written Opinion of the International Searching Authority dated Jan. 24, 2017, 14 pages.
Huawei, et al., "PDCCH design for short TTI", 3GPP TSG RAN WG1 Meeting #84bis, R1-162109, Apr. 2016, 5 pages.
Interdigital, "Short-TTI PDCCH Design", 3GPP TSG RAN WG1 Meeting #84bis, R1-162963, Apr. 2016, 4 pages.

* cited by examiner

FIG. 2
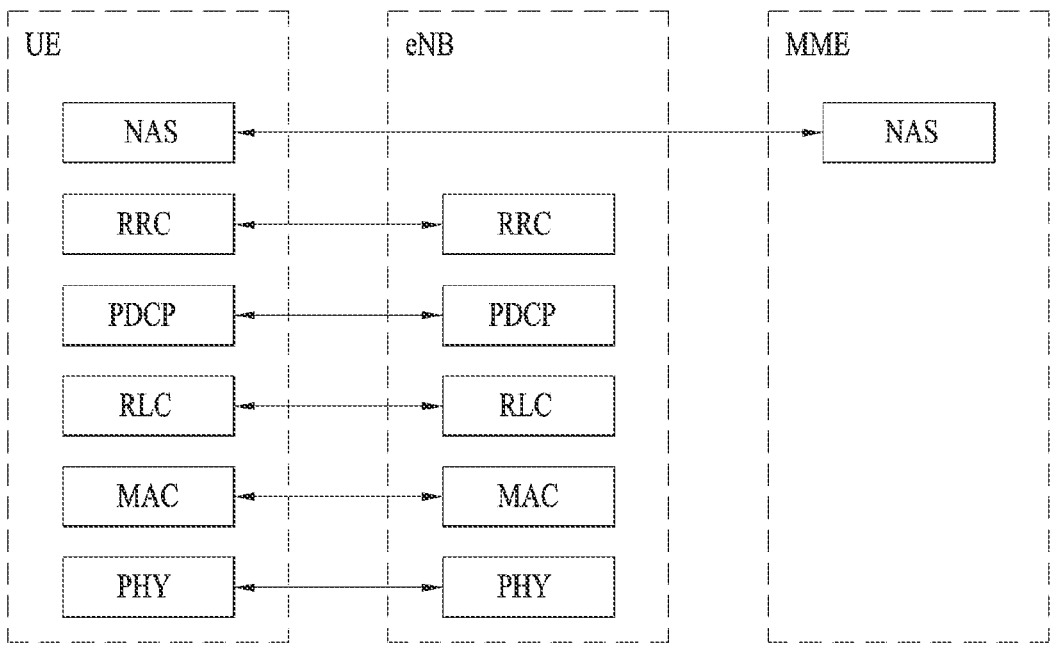
(A) CONTROL-PLANE PROTOCOL STACK
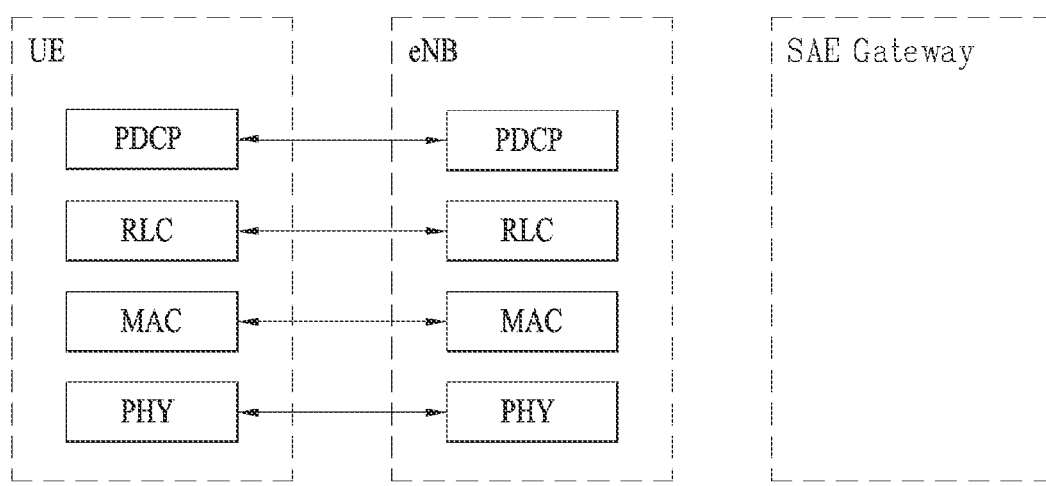
(B) USER-PLANE PROTOCOL STACK

METHOD FOR CELL CYCLIC DOWNLINK TRANSMISSION IN WIRELESS COMMUNICATION SYSTEM AND APPARATUS THEREFOR

CROSS-REFERENCE TO RELATED APPLICATIONS

This application is a continuation of U.S. patent application Ser. No. 16/088,525, filed on Sep. 26, 2018, which is the National Stage filing under 35 U.S.C. 371 of International Application No. PCT/KR2016/011670, filed on Oct. 18, 2016, which claims the benefit of U.S. Provisional Application No. 62/319,301, filed on Apr. 7, 2016, the contents of which are all hereby incorporated by reference herein in their entirety.

TECHNICAL FIELD

The present invention relates to a wireless communication system, and more particularly, to a method for cell cycling downlink transmission in a wireless communication system and apparatus therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Based on the above discussion, the present invention proposes a method for cell cycling downlink transmission in a wireless communication system and apparatus therefor.

Technical Solutions

In an aspect of the present invention, provided herein is a method for receiving a downlink signal by a User Equipment (UE) in a wireless communication system. The method may include: receiving a downlink control signal, a first downlink data signal, and a first downlink demodulation reference signal for the first downlink data signal in a first time unit; and receiving a second downlink data signal and a second downlink demodulation reference signal for the second downlink data signal in a second time unit. In this case, the downlink control signal may include information on a first antenna port of a reference signal that is Quasi Co-Located (QCLed) with an antenna port of the first downlink demodulation reference signal and information on a second antenna port of a reference signal that is QCLed with an antenna port of the second downlink demodulation reference signal.

In another aspect of the present invention, provided herein is a User Equipment (UE) in a wireless communication system. The UE may include: a wireless communication module configured to transmit and receive signals to and from a plurality of transmitting ends; and a processor configured to process the signals. In this case, the processor may be configured to receive a downlink control signal, a first downlink data signal, and a first downlink demodulation reference signal for the first downlink data signal in a first time unit and receive a second downlink data signal and a second downlink demodulation reference signal for the second downlink data signal in a second time unit. In addition, the downlink control signal may include information on a first antenna port of a reference signal that is Quasi Co-Located (QCLed) with an antenna port of the first downlink demodulation reference signal and information on a second antenna port of a reference signal that is QCLed with an antenna port of the second downlink demodulation reference signal.

Preferably, the downlink control signal may include scheduling information for receiving the first and second data signals.

Preferably, each of the first and second antenna ports may correspond to a Channel Status Information-Reference Signal (CSI-RS) antenna port.

More preferably, a channel estimated using the first downlink demodulation reference signal from the first time unit may be independent from a channel estimated using the second downlink demodulation reference signal from the second time unit.

In particular, the first downlink data signal may be identical to the second downlink data signal. Alternatively, the first and second data signals may be segmented from one downlink data signal. Additionally, either the last symbol of the first time unit or the first symbol of the second time unit may be a muted symbol.

Advantageous Effects

According to the present invention, in a wireless communication system, a base station and a user equipment can perform downlink transmission and reception more efficiently by using a cell cycle scheme.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram illustrating structures of a control plane and a user plane of a radio interface protocol between a UE and an E-UTRAN based on the 3GPP radio access network specification.

BEST MODE FOR INVENTION

Figure 1:
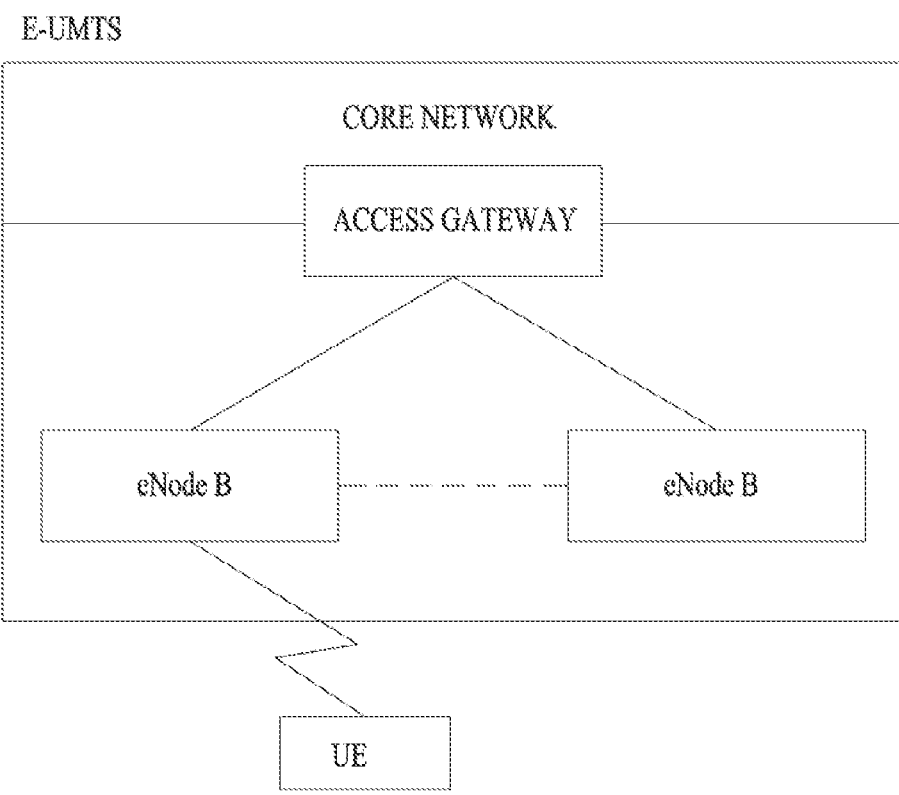
FIG. 1 is a diagram schematically illustrating a network structure of an E-UMTS as an exemplary radio communication system.

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A cell constructing an eNB is configured by one of bandwidths among 1.25, 2.5, 5, 10, 15, and 20 MHz and provides DL or UL transmission service to a plurality of UEs. Cells different from each other can be configured to provide a different bandwidth.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
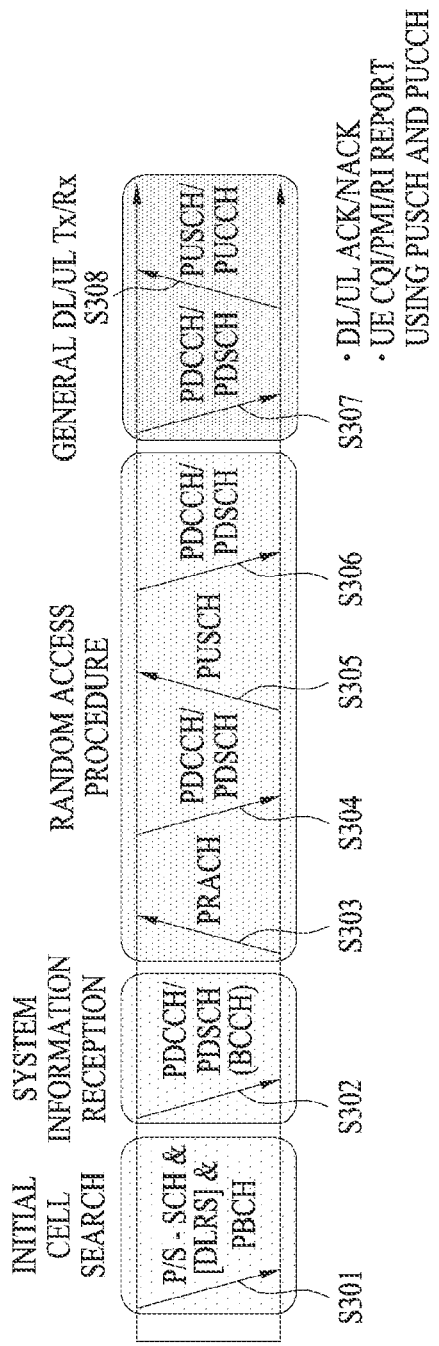
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
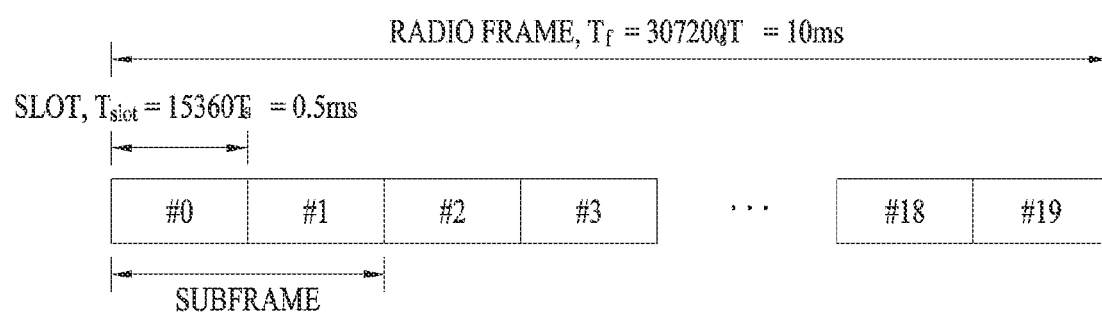
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×$10^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
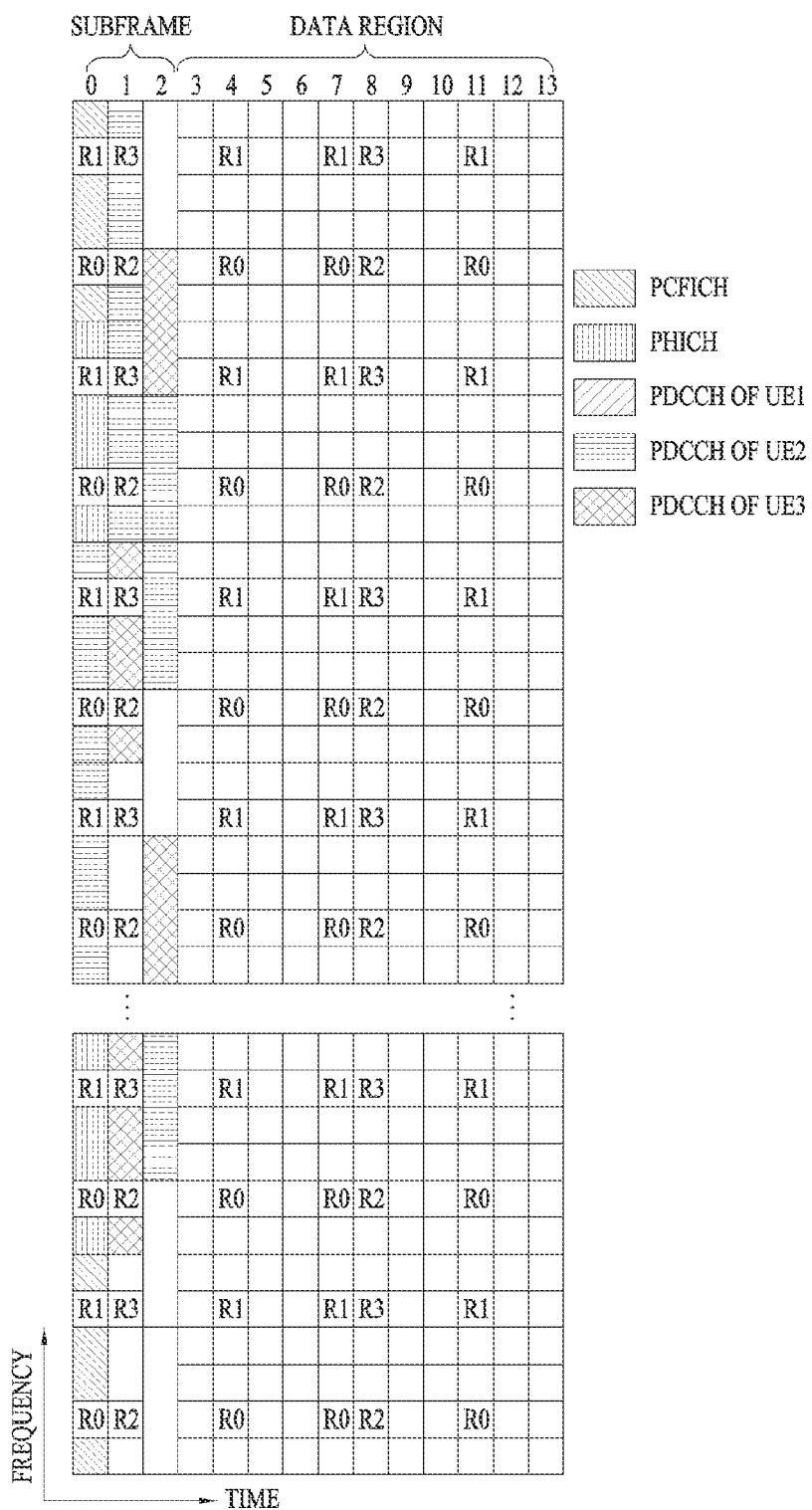
FIG. 5 is a diagram illustrating the structure of a DL radio frame used in an LTE system.

FIG. 5 is a diagram illustrating control channels included in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
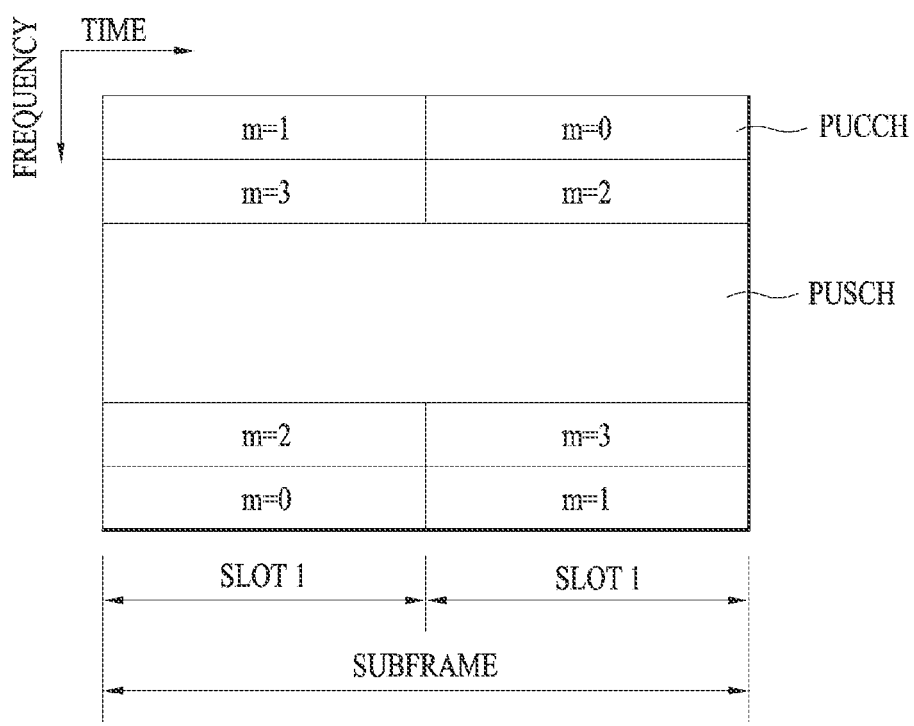
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Meanwhile, it is expected that a LTE-A system, which is a standard of a next generation mobile communication system, will support a CoMP (coordinated multi point) transmission method, which is not supported by the conventional standard, to enhance a data transmission rate. In this case, the CoMP transmission method is a transmission method for two or more base stations or cells to communicate with the user equipment in a manner of cooperating with each other to enhance a communication performance between the user equipment situated at a radio shadow zone and the base station (a cell or a sector).

The CoMP transmission method can be classified into a join processing (COMP joint processing, CoMP-JP) method in the form of a cooperative MIMO via data sharing and a coordinated scheduling/beamforming (CoMP-coordinated scheduling/beamforming, CoMP-CS/CB) method.

According to the joint processing (CoMP-JP) method in DL, a user equipment may be able to instantaneously receive data simultaneously from each of the base stations performing the CoMP transmission method. And, a reception performance can be enhanced in a manner of combining the signals received from each of the base stations (Joint Transmission (JT)). And, it is also possible to consider a method of transmitting a data to the user equipment on a specific timing by one of the base stations performing the CoMP transmission method (Dynamic Point Selection (DPS)). On the other hand, according to the coordinated scheduling/beamforming method (CoMP-CS/CB), the user equipment may be able to instantaneously receive data from a single base station via a beamforming.

According to the joint processing (CoMP-JP) method in UL, each of the base stations may be able to simultaneously receive PUSCH signal from the user equipment (Joint Reception (JR)). On the other hand, according to the coordinated scheduling/beamforming method (CoMP-CS/CB), only a single base station may be able to receive the PUSCH. In this case, the decision to use the coordinated scheduling/beamforming method is determined by the coordinating cells (or base stations).

Hereinafter, Channel Stat Information (CSI) will be described. In the current LTE standards, there are two transmission schemes: open-loop MIMO operating without CSI and closed-loop MIMO operating based on CSI. In particular, in the closed-loop MIMO system, a BS and a UE can perform beamforming based on CSI to obtain multiplexing gain of MIMO antennas. To obtain CSI from a UE, a BS transmits a reference signal to the UE and instructs the UE to feed back the CSI measured based on the RS through a Physical Uplink Control Channel (PUCCH) or a Physical Uplink Shared Channel (PUSCH).

CSI is divided into the following three types: Rank Indicator (RI), Precoding Matrix Index (PMI), and Channel Quality Indication (CQI). First, the RI is rank information of a channel as described above and indicates the number of streams that a UE can receive on the same time-frequency resource. Since the RI is determined by long-term fading of the channel, it is fed back to a BS with a periodicity longer than that of the PMI or CQI. Second, the PMI is a value that reflects the spatial characteristics of a channel and indicates a precoding matrix index of a BS, which is preferred by a UE, based on a metric such as an SINR. Lastly, the CQI is a value indicating the strength of a channel and indicates a received SINR obtainable when a BS uses the PMI.

Hereinafter, a reference signal (RS) will be described.

In general, for channel measurement, a reference signal previously known to both transmitting and receiving ends is transmitted with data from the transmitting end to the receiving end. The reference signal provides information on a modulation scheme as well as information for the channel measurement so that demodulation can be performed. The reference signal is classified into: a Dedicated Reference Signal (DRS) for a BS and a specific UE, i.e., a UE-specific reference signal; and a Cell-specific Reference Signal (CRS) for all UEs in a cell, i.e., a common RS. In addition, the CRS includes a reference signal used by a UE to measure CQI/PMI/RI and report the same to a BS, which is referred to as a Channel State Information Reference Signal (CSI-RS).

In the following, QCL (Quasi Co-Location) between antenna ports is explained.

QCL between antenna ports indicates that all or a part of large-scale properties of a signal (or a radio channel corresponding to a corresponding antenna port) received by a user equipment from a single antenna port may be identical to large-scale properties of a signal (or a radio channel corresponding to a corresponding antenna port) received from a different single antenna port. In this case, the larger-scale properties may include Doppler spread related to frequency offset, Doppler shift, average delay related to timing offset, delay spread and the like. Moreover, the larger-scale properties may include average gain as well.

According to the aforementioned definition, a user equipment cannot assume that the large-scale properties are identical to each other between antenna ports not in the QCL, i.e., NQCL (Non Quasi co-located) antenna ports. In this case, the user equipment should independently perform a tracking procedure to obtain frequency offset, timing offset and the like according to an antenna port.

On the contrary, the user equipment can perform following operations between antenna ports in QCL.

1) The user equipment can identically apply power-delay profile for a radio channel corresponding to a specific antenna port, delay spread, Doppler spectrum and Doppler spread estimation result to a Wiener filter parameter, which is used for estimating a channel for a radio channel corresponding to a different antenna port, and the like.

2) After obtaining time synchronization and frequency synchronization for the specific antenna port, the user equipment can apply identical synchronization to a different antenna port as well.

3) The user equipment can calculate an average value of RSRP (reference signal received power) measurement values of each of the antenna ports in QCL to obtain average gain.

For instance, having received DM-RS based downlink data channel scheduling information (e.g., DCI format 2C) via PDCCH (or E-PDCCH), the user equipment performs channel estimation for PDSCH via a DM-RS sequence indicated by the scheduling information and may be then able to perform data demodulation.

In this case, if a DM-RS antenna port used for demodulating a downlink data channel and a CRS antenna port of a serving cell are in QCL, when the user equipment performs a channel estimation via the DM-RS antenna port, the user equipment can enhance reception capability of the DM-RS based downlink data channel in a manner of applying large-scale properties of a radio channel estimated from a CRS antenna port of the user equipment as it is.

Similarly, if a DM-RS antenna port used for demodulating a downlink data channel and a CSI-RS antenna port of a serving cell are in QCL, when the user equipment perform a channel estimation via the DM-RS antenna port, the user equipment can enhance reception capability of the DM-RS based downlink data channel in a manner of applying large-scale properties of a radio channel estimated from a CSI-RS antenna port of the serving cell as it is.

In the LTE system, it is defined that when a BS transmits a downlink signal in transmission mode 10, which is the CoMP mode, the BS configures either QCL type A or QCL type B for a UE through a higher layer signal.

Here, QCL type A assumes that antenna ports for a CRS, a DM-RS, and a CSI-RS are quasi co-located (QCLed) with respect to channel properties except average gain, and it means that physical channels and signals are transmitted on the same node (point). On the other hand, in QCL type B, up to four QCL modes are configured for each UE through a higher layer message to enable CoMP transmission such as DPS, JT, etc., and which QCL mode will be used to receive a DL signal is dynamically indicated through Downlink Control Information (DCI).

Hereinafter, DPS transmission when QCL type B is configured will be described in detail.

First, it is assumed that node #1 having $N_1$ antenna ports transmits CSI-RS resource #1 and node #2 having $N_2$ antenna ports transmits CSI-RS resource #2. In this case, CSI-RS resource #1 is included in QCL mode parameter set #1, and CSI-RS resource #2 is included in QCL mode parameter set #2. Moreover, a BS configures parameter sets #1 and #2 for a UE located within the common coverage of nodes #1 and #2 through a higher layer signal.

Thereafter, the BS may perform DPS by configuring parameter set #1 using DCI when transmitting data (i.e., PDSCH) to the corresponding UE through node #1 and configuring parameter set #2 when transmitting data through node #2. When parameter set #1 is configured through the DCI, the UE may assume that CSI-RS resource #1 is QCLed with a DM-RS. And, when parameter set #2 is configured, the UE may assume that CSI-RS resource #2 is QCLed with a DM-RS.

Meanwhile, the current cellular system has evolved from 4G to 5G. For use of the 5G communication system, the requirements for supporting not only conventional enhanced mobile broadband (eMBB) services based on smartphones but also various Internet of Things (IoT) application services such as health care, disaster and safety management, vehicle communication, manufacturing plant control, robot control, etc. have been defined. In supporting the IoT application services, how much time is required for data transmission and how reliably data transmission can be performed become more important than the data transmission rate, which has been considered as a main issue in the prior art. In 3GPP, such a service is named as Ultra-Reliable Low Latency Communication (URLLC).

In the URLLC, it becomes important to secure reliability with respect to a radio channel state. Regarding the reliability, the requirement of a radio link is generally defined as follows: the probability of transmitting a y-bytes packet in x microseconds should be equal to or higher than z %. For example, it can be defined that the probability of transmitting a 100-byte packet in 1 microsecond should be equal to or higher than 99.999%. The most difficult thing in satisfying such a requirement is that if the quality of a radio channel is significantly degraded, the capacity of the corresponding channel does not satisfy the above-described requirement.

The present invention proposes to solve this issue by obtaining cell/BS diversity. In other words, when multiple cells/BS/TPs transmit the same data, even if a radio channel of a specific cell/BS/TP is degraded, a UE can receive information from another cell/BS/TP with a relatively good channel state. By doing so, the reliability requirement can be satisfied. To this end, the present invention proposes the following methods.

For downlink transmission, a plurality of cells/BSs/TPs/beams alternately perform data transmission to a specific UE according to the order defined between a BS and the UE, that is, perform cell cycling downlink transmission. In performing the continuous transmission, downlink grant information is signaled to the UE one time.

When this method is applied, various methods can be considered to configure downlink signals that individual cells/BSs/TPs will transmit. The simplest method is that each cell/BS/TP repeatedly transmits the same downlink signal. That is, each cell/BS/TP transmits a signal to which the same channel coding is applied based on the same information bits sequentially and repeatedly. Alternatively, a method where after one information bit is coded by reducing a coding rate in proportion to the number of participating cells/BSs/TPs and the cells/BSs/TPs transmits the coded bits in a distributed manner can also be considered. These methods can be categorized into extended channel coding and separated channel coding.

1) Extended Channel Coding

The extended channel coding means a scheme of applying channel coding such that one decoder can decode different parity bits of codewords encoded by difference cells/BSs/TPs. The extended channel coding can be classified as follows.

(1) Channel coding where information bits are repeated: According to this channel coding scheme, for a Transport Block (TB), different cells/BSs/TPs configure the same information bits and different parity bits. By determining parity bits to be encoded in advance, it is possible to avoid the parity bits of the different cells/BSs/TPs from overlapping. For example, when there are N cells/BSs/TPs, all parity bits, which occurs during encoding, are divided into N groups, and each cell/BS/TP is configured to use parity bits in a corresponding group. In this case, if a device receives a corresponding signal, the device can obtain parity group information transmitted from each cell/BS/TP and perform decoding by assorting parity bits in TBs transmitted from the individual cells/BSs/TPs per group.

(2) Channel coding where no information bits are repeated: According to this channel coding scheme, different cells/BSs/TPs create one TB group by grouping a plurality of TBs and perform channel coding based on the size of the TB group. This scheme has an advantage in that the greatest channel coding gain can be obtained, but it also has a disadvantage in that for decoding, all cells/BSs/TPs should perform TB transmission.

2) Separated Channel Coding

The separated channel coding can be classified into a repetition-based Log Likelihood Ratio (LLR) combining scheme and a hard value combining scheme. In the former case, different cells/BSs/TPs use the same size of TBs and repeatedly transmit the same TB. If a device receives a corresponding signal, the device can obtain LLR values by performing processes before decoding in an independent manner. Thereafter, the device can use the sum of calculated LLR values as one input value for a decoder.

On the other hand, according to the hard value combining scheme, different cells/BSs/TPs use the same size of TBs and repeatedly transmit the same TB. In addition, TBs received from the different cells/BS/TPs are independently decoded. In this case, if any one of the TBs received from the different cells/BS/TPs is successfully decoded, it is determined that signal reception is successful.

For the above-described cell cycling downlink transmission, a network schedules scheduling information for a plurality of consecutive subframes in the first subframe only one time, and a plurality of cells/BSs/TPs participate in downlink transmission of the plurality of consecutive subframes.

In this case, information indicating whether downlink scheduling is performed on the plurality of consecutive subframes is provided to a UE through higher layer signaling such as a MAC layer message, an RRC layer message, etc. Alternatively, the information may be provided to a UE together with downlink scheduling information. In case a UE is able to know that URLLC information will be transmitted in advance, the corresponding information may be omitted. Additionally, it is regulated that when a UE receives a downlink grant in a specific subframe, the UE should not perform any action of searching for other downlink grants, for example, blind decoding during N consecutive subframes after the specific subframe.

Figure 7:
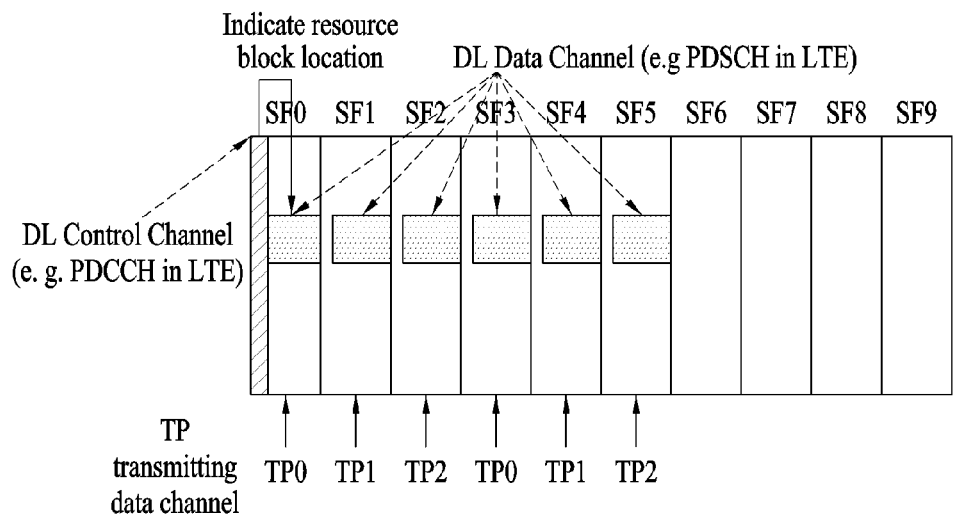
FIGS. 7 and 8 illustrate examples of scheduling for cell cycling downlink transmission according to an embodiment of the present invention.
Figure 8:
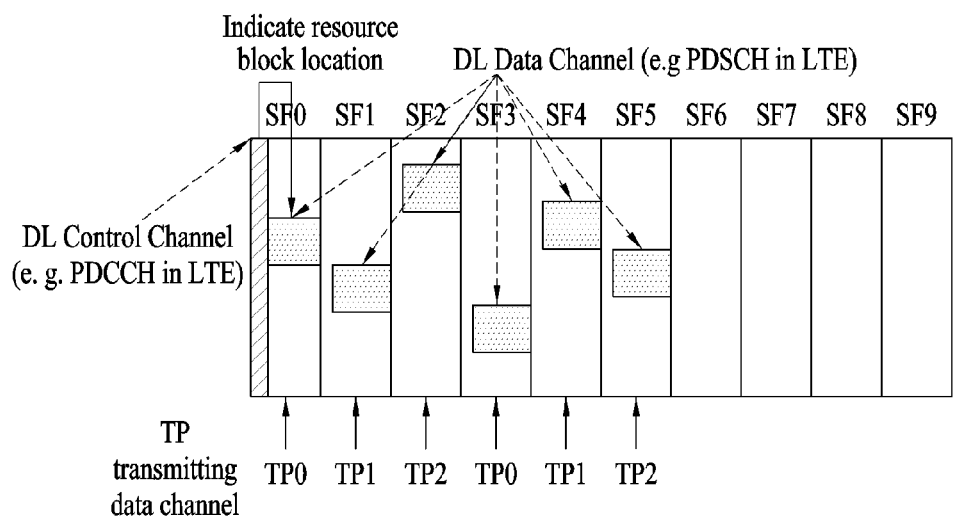

FIGS. 7 and 8 illustrate examples of scheduling for cell cycling downlink transmission according to an embodiment of the present invention.

Specifically, FIG. 7 shows an example where a resource scheduled in the first subframe continues in a plurality of consecutive subframes, and FIG. 8 shows an example where a resource scheduled in the first subframe hops in a plurality of consecutive subframes according to a predetermined rule. When resource hopping is applied, it has an advantage in that frequency diversity can be obtained even when channel quality measurement for multiple cells are not completely performed. When the network supports both the case where the resource hopping is applied and the case where there is no resource hopping, whether the resource hopping is applied or not may be signaled to a UE through physical layer information or higher layer information.

In the above description, the basic unit for switching transmission between cells/BSs/TPs is assumed to be a subframe, but the present invention is not limited thereto. For example, a method for switching transmission per multiple symbol groups can be considered.

Figure 9:
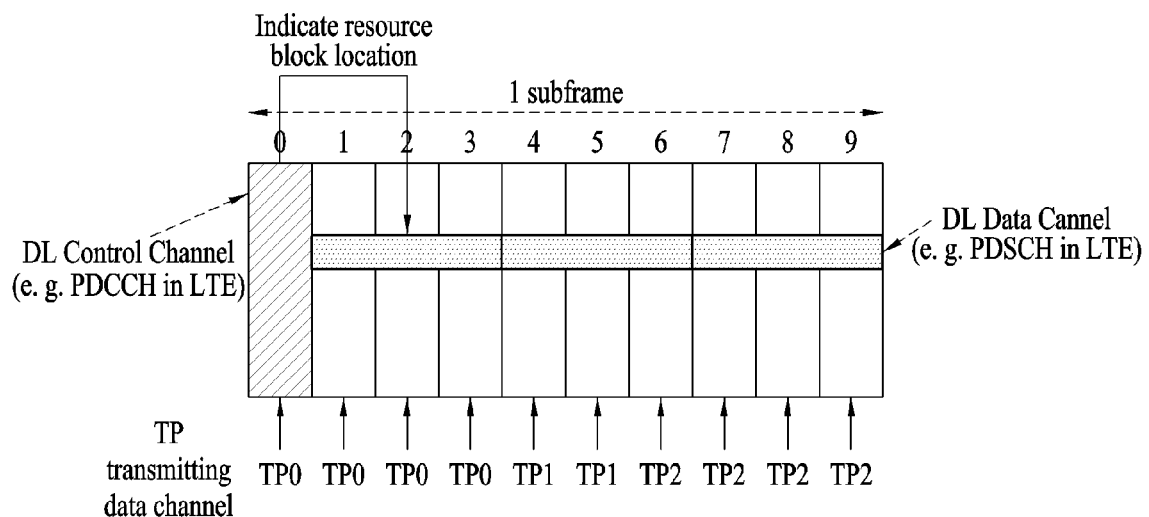
FIG. 9 illustrates an example of performing the cell cycling downlink transmission according to the embodiment of the present invention on a symbol-group basis.

FIG. 9 illustrates an example of performing the cell cycling downlink transmission according to the embodiment of the present invention on a symbol-group basis. Specifically, FIG. 9 shows that a plurality of TPs alternately perform transmission by every three symbols.

Hereinafter, for convenience of description, the time during which each cell/BS/TP alternately performs transmission, for example, one subframe of FIGS. 7 and 8 or three symbols of FIG. 9 is defined as a Time Unit (TU).

Meanwhile, regarding UE demodulation behavior in the cell cycling downlink transmission according to the embodiment of the present invention, it is desirable that upon receiving downlink allocation information on consecutive TUs, a UE independently uses reference signals transmitted in the individual TUs in demodulating individual downlink data channels and does not use an integrated estimation scheme, for example, a channel interpolation scheme for the TUs in performing channel estimation. This is because the cell cycling downlink communication assumes that a reference signal is transmitted for each TU, and in this case, since different cells/BSs/TPs perform transmission in different TUs, the channel estimation should be independently performed.

Figure 10:
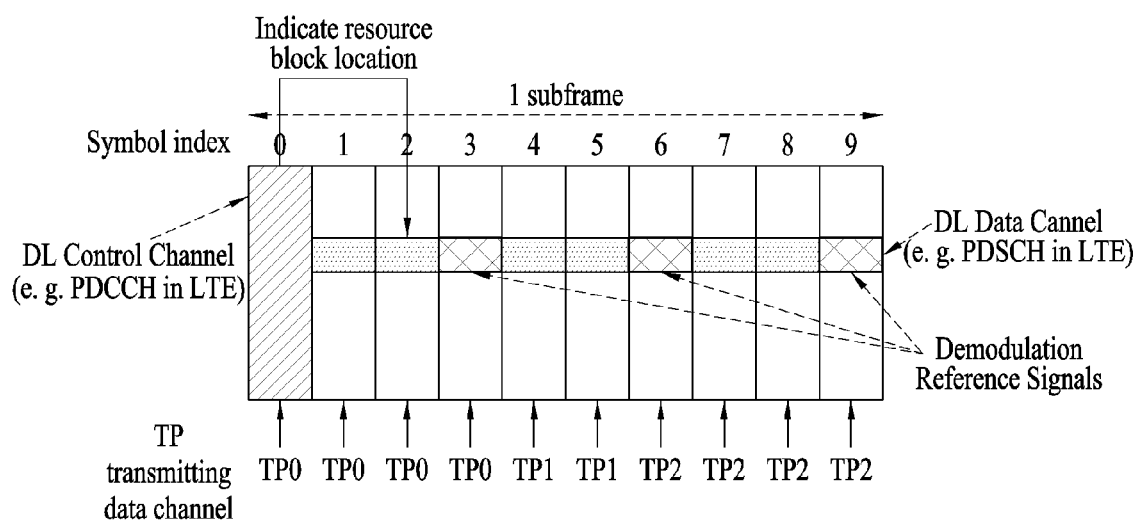
FIG. 10 illustrates an example of channel estimation for the cell cycling downlink transmission according to the embodiment of the present invention.

FIG. 10 illustrates an example of channel estimation for the cell cycling downlink transmission according to the embodiment of the present invention. In particular, it is assumed in FIG. 10 that one TU is composed of three symbols as shown in FIG. 9.

Referring to FIG. 10, when reference signals are transmitted in symbol #3, symbol #6, and symbol #9, a channel estimation value obtained by using the reference signal of symbol #3 is used for demodulation of symbol #1 and symbol #2. Similarly, for symbol #4 and symbol #5, a channel estimation value obtained by using the reference signal of symbol #6 is used, and for symbol #7 and symbol #8, a channel estimation value obtained by using the reference signal of symbol #9 is used. In this case, a channel interpolation scheme is not applied to the reference signals transmitted in the respective TUs.

In performing the cell cycling downlink transmission according to the embodiment of the present invention, the network signals to a UE at least one piece of the following information (a) to (c) regarding a plurality of cells/BSs/TPs that participate in downlink data transmission.

(a) Cell/BS/TP ID information transmitted in each TU (b) A physical resource location and/or sequence information of a reference signal transmitted in each TU (c) An indicator indicating whether a reference signal transmitted in each TU is QCLed with other reference signals (transmitted in a serving cell)

Since reference signals transmitted in individual TUs are for different cells/TPs, physical resource (time/frequency) locations and/or sequences corresponding to different cell/TP IDs may be used. Thus, the corresponding information should be signaled to allow a UE to perform channel estimation by receiving these reference signals. For example, the IDs of participating cells/TPs can be directly transmitted as described in (a). Alternatively, the scrambling ID of a reference signal can be transmitted as described in (b), and in this case, the network may transmit information on a scrambling ID set of continuously transmitted reference signals to the UE in a physical layer or higher layer message. In particular, considering that for a cell/TP that transmits a downlink grant, the first TU can be used for a predetermined cell/TP ID and the scrambling ID of a reference signal, information on the remaining reference signals may be signaled except information on the first TU.

Alternatively, by indicating whether QCL is performed between reference signals and antenna port as described in (c), it is possible to inform whether the same BS/cell/TP participates in the transmission per TU. Specifically, according to the present invention, since every TP/beam transmits a DM-RS in each TU, it may be premised that QCL cannot be performed between DM-RS ports transmitted in each TU. In this case, different CSI-RS resources QCLed with the DM-RS ports in each TU may be signaled, and the UE may know whether the same BS/cell/TP participates in the downlink transmission per TU.

To this end, the DCI transmitted in the first TU to the UE may include information on CSI-RS resources that can be QCLed with DM-RSs of the first TU together with scheduling information for N subsequent subframes. The DCI transmitted in each of the subsequent TUs may include information on CSI-RS resources that can be QCLed with DM-RSs of a corresponding TU. That is, the scheduling information for N subsequent TUs is provided by the DCI of the first TU, but the information on the CSI-RS resource where the QCL assumption can be applied is provided by each TU.

Of course, the DCI transmitted in the first TU to the UE may provide both the scheduling information for the N subsequent TUs and the information on the CSI-RS resources of each TU where the QCL assumption can be applied. In this case, a process for detecting control information, for example, blind decoding can be omitted in the N subsequent N TUs.

Additionally, the DCI transmitted in the first TU to the UE may provide the scheduling information for the N subsequent TUs, but the number of DM-RS ports and MCS level corresponding to rank information may be set to be the same in the N subsequent TUs. Of course, the number of DM-RS ports and MCS level may be separately signaled for each of the N subsequent TUs.

Meanwhile, regarding the cell cycling downlink transmission according to the embodiment of the present invention, it is desirable that when a BS/cell/TP continuously transmits TUs, the BS/cell/TP perform muting on symbols at TU boundary points. For example, when N consecutive TUs are transmitted, the last symbols of the first to $(N-1)^{th}$ TUs may be muted. Alternatively, when N consecutive TUs are transmitted, the first symbols of the second to $N^{th}$ TUs may be muted. This is because when a UE receives signals from BSs, each of which transmits a signal at a different distance from the UE, the symbols at the TU boundaries may collide with each other and cause interference due to different time synchronization per TU. The above-described muting operation could be interpreted in various ways, for example, as dropping transmission of a specific physical signal or channel, puncturing or rate matching of Resource Elements (REs) corresponding to the specific physical channel.

Figure 11:
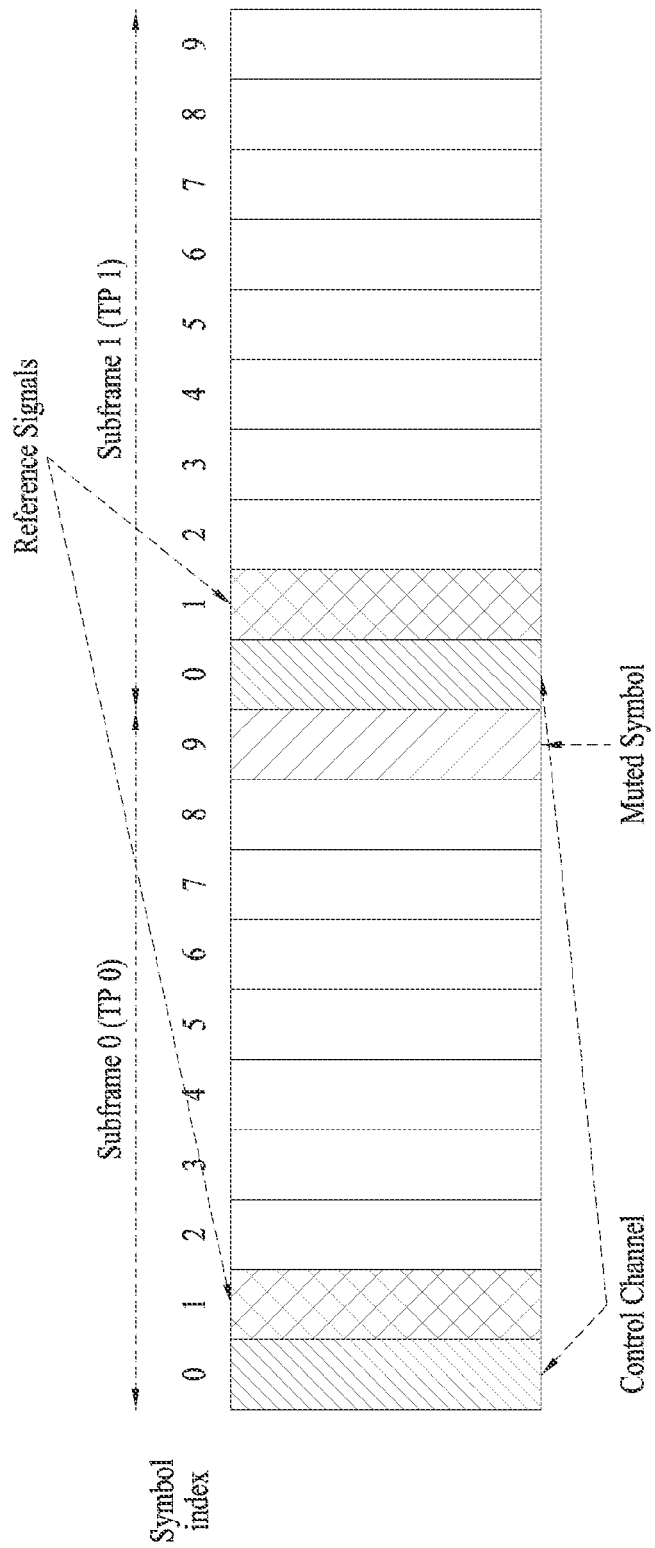
FIG. 11 illustrates an example of muting operation in the cell cycling downlink transmission according to the embodiment of the present invention.

FIG. 11 illustrates an example of the muting operation in the cell cycling downlink transmission according to the embodiment of the present invention. In particular, FIG. 11 shows that when N consecutive TUs are transmitted, the last symbols of the first to $(N-1)^{th}$ TUs are muted. In other words, from FIG. 11, it can be seen that the last symbol of the data channel is muted.

Figure 12:
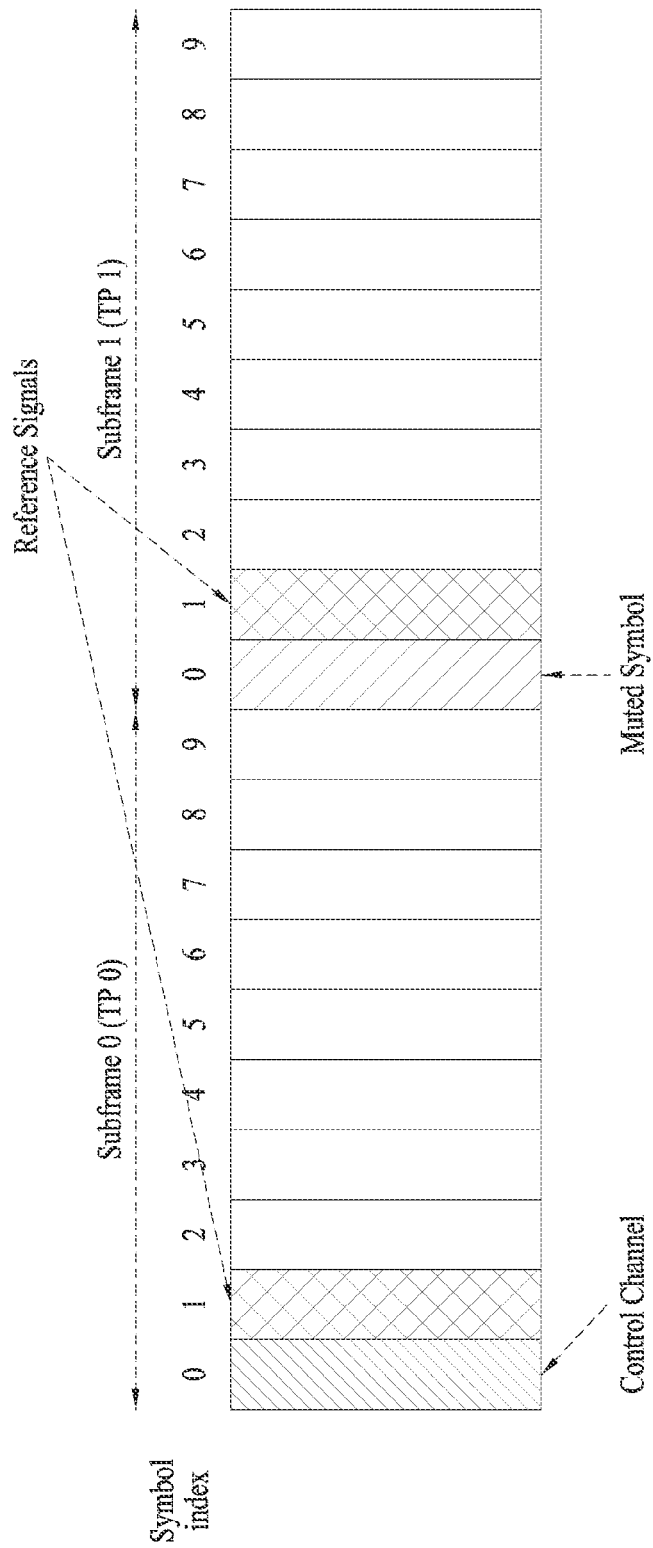
FIG. 12 illustrates another example of muting operation in the cell cycling downlink transmission according to the embodiment of the present invention.

FIG. 12 illustrates another example of the muting operation in the cell cycling downlink transmission according to the embodiment of the present invention. In particular, FIG. 12 shows that when N consecutive TUs are transmitted, the first symbols of the second to $N^{th}$ TUs are muted. In other words, from FIG. 12, it can be seen that the control channel transmitted in the first symbol of each of the consecutive subframes is dropped at TP1 that transmits a corresponding subframe.

Additionally, synchronization between cells needs to be considered in the cell cycling downlink transmission according to the embodiment of the present invention.

To this end, methods (A) and (B) can be considered. According to method (A), a network provides a list of BSs/cells/TPs that are likely to perform continuous downlink transmission to a UE through a higher layer signal in advance. Upon receiving a corresponding message, the UE may store configuration values for achieving time/frequency synchronization in advance in order to handle the case where the BSs/cells/TPs in the corresponding list perform the continuous downlink transmission. Alternatively, according to method (B), when receiving a data channel transmitted in each TU, a UE may adjust time/frequency synchronization per TU using a reference signal transmitted in a corresponding TU.

In the cell cycling downlink transmission according to the embodiment of the present invention, since different BSs/cells/TPs transmit different TUs, the time/frequency synchronization should be separately achieved. In method (A), candidate BSs/cells/TPs are informed in advance to receive synchronization signals. In method (B), a synchronization difference from the previous BS/cell/TP is adjusted using a reference signal transmitted in a corresponding TU. Methods (A) and (B) can be used separately or together, when the two methods are used together, method (B) may be used for precise synchronization adjustment.

Although the present invention assumes that transmission is performed by different BSs/cells/TPs, which are physically away from each other, the invention is not limited thereto. When BSs installed at the same physical locations manage multiple frequency bands (carriers), the methods of the present invention can be applied by considering each of the frequency bands as a logical cell. In other words, the present invention can be applied when transmission is performed using different carriers to obtain frequency diversity gain. Similarly, the invention can be extensively applied when different BSs/cells/TPs use different carriers.

Figure 13:
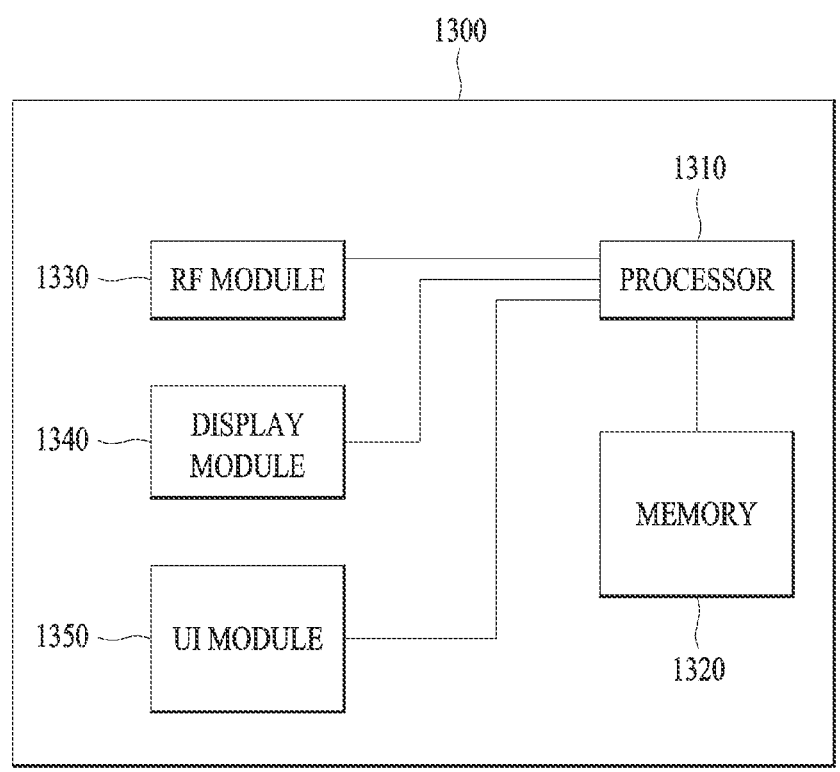
FIG. 13 is a block diagram of a communication apparatus according to an embodiment of the present invention.

FIG. 13 is a block diagram of a communication apparatus according to an embodiment of the present invention.

Referring to FIG. 13, a communication apparatus 1300 includes a processor 1310, a memory 1320, a Radio Frequency (RF) module 1330, a display module 1340 and a user interface module 1350.

The communication apparatus 1300 is shown for convenience of description and some modules thereof may be omitted. In addition, the communication apparatus 1300 may further include necessary modules. In addition, some modules of the communication apparatus 1300 may be subdivided. The processor 1310 is configured to perform an operation of the embodiment of the present invention described with respect to the drawings. For a detailed description of the operation of the processor 1310, reference may be made to the description associated with FIGS. 1 to 12.

The memory 1320 is connected to the processor 1310 so as to store an operating system, an application, program code, data and the like. The RF module 1330 is connected to the processor 1310 so as to perform a function for converting a baseband signal into a radio signal or converting a radio signal into a baseband signal. The RF module 1330 performs analog conversion, amplification, filtering and frequency up-conversion or inverse processes thereof. The display module 1340 is connected to the processor 1310 so as to display a variety of information. As the display module 1340, although not limited thereto, a well-known device such as a Liquid Crystal Display (LCD), a Light Emitting Diode (LED), or an Organic Light Emitting Diode (OLED) may be used. The user interface module 1350 is connected to the processor 1310 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The above-mentioned embodiments of the present invention are disclosed on the basis of a data communication relationship between a base station and a user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes than the base station. The term "Base Station" may be replaced with the terms fixed station, Node-B, eNode-B (eNB), or access point as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although the method for cell cycling downlink transmission in a wireless communication system and apparatus therefor are described based on the 3GPP LTE system, the method and apparatus can be applied to various wireless communication systems as well as the 3GPP LTE system.

What is claimed is:

1. A method of receiving a downlink signal by a user equipment (UE) in a wireless communication system, the method comprising:
   receiving a single downlink control information (DCI) for scheduling two physical downlink shared channels (PDSCHs) each including a same transport block (TB); and
   based on the single DCI, receiving the two PDSCHs from different transmission reception points (TRPs),
   wherein the two PDSCHs are transmitted apart by one or more symbol gaps from each other.

2. The method of claim 1, wherein the single DCI includes information representing i) a first quasi co-location (QCL) relationship between one or more reference signals and a first demodulation reference signal (DM-RS) port of a first PDSCH and ii) a second QCL relationship between one or more reference signals and a second DM-RS port of a second PDSCH.

3. The method of claim 2, wherein the first QCL relationship is applied to the first PDSCH included in the two PDSCHs and the second QCL relationship is applied to the second PDSCH included in the two PDSCHs.

4. The method of claim 2, wherein based on the single DCI, receiving the two PDSCHs comprises:
   based on the single DCI, receiving multiple PDSCHs including the two PDSCHs, and
   wherein the first QCI relationship and the second QCL relationship are cyclically applied to the multiple PDSCHs.

5. The method of claim 1, wherein the two PDSCHs are generated based on the same transport block (TB).

6. The method of claim 1, wherein the two PDSCHs are received in non-overlapping time resources having a same number of symbols.

7. The method of claim 1, wherein the two PDSCHs are transmitted alternately from the different TRPs.

8. The method of claim 1, wherein the two PDSCHs are transmitted in a same frequency resource.

9. A user equipment (UE) configured to receive downlink signal in a wireless communication system, the UE comprising:
   at least one processor; and
   at least one computer memory operably coupled to the at least one processor and configured to cause, when executed, the at least one processor to perform operations, the operations comprising:

receiving a single downlink control information (DCI) for scheduling two physical downlink shared channels (PDSCHs) each including a same transport block (TB); and based on the single DCI, receiving the two PDSCHs from different transmission reception points (TRPs), wherein the two PDSCHs are transmitted apart by one or more symbol gaps from each other.

10. The UE of claim 9, wherein the single DCI includes information representing i) a first quasi co-location (QCL) relationship between one or more reference signals and a first demodulation reference signal (DM-RS) port of a first PDSCH and ii) a second QCL relationship between one or more reference signals and a second DM-RS port of a second PDSCH.

11. The UE of claim 10, wherein the first QCL relationship is applied to the first PDSCH included in the two PDSCHs and the second QCL relationship is applied to the second PDSCH included in the two PDSCHs.

12. The UE of claim 10, wherein based on the single DCI, receiving the two PDSCHs comprises:

based on the single DCI, receiving multiple PDSCHs including the two PDSCHs, and wherein the first QCI relationship and the second QCL relationship are cyclically applied to the multiple PDSCHs.

13. The UE of claim 9, wherein the two PDSCHs are generated based on the same transport block (TB).

14. The UE of claim 9, wherein the two PDSCHs are received in non-overlapping time resources having a same number of symbols.

15. The UE of claim 9, wherein the two PDSCHs are transmitted alternately from the different TRPs.

16. The UE of claim 9, wherein the two PDSCHs are transmitted in a same frequency resource.

17. A base station (BS) configured to transmit a downlink signal to a user equipment (UE) in a wireless communication system, the BS comprising:

at least one transceiver;

at least one processor; and at least one computer memory operably coupled to the at least one processor and configured to cause, when executed, the at least one processor to perform operations, the operations comprising:

transmitting a single downlink control information (DCI) for scheduling two physical downlink shared channels (PDSCHs), each including a same transport block (TB); and based on the single DCI, transmitting the two PDSCHs to the UE, wherein the two PDSCHs are transmitted apart by one or more symbol gaps from each other.

18. The BS of claim 17, wherein the single DCI includes information representing i) a first quasi co-location (QCL) relationship between one or more reference signals and a first demodulation reference signal (DM-RS) port of a first PDSCH and ii) a second QCL relationship between one or more reference signals and a second DM-RS port of a second PDSCH.

19. The BS of claim 18, wherein the first QCL relationship is applied to the first PDSCH included in the two PDSCHs and the second QCL relationship is applied to the second PDSCH included in the two PDSCHs.

20. The BS of claim 18, wherein based on the single DCI, transmitting the two PDSCHs comprises:

based on the single DCI, transmitting multiple PDSCHs including the two PDSCHs, and wherein the first QCI relationship and the second QCL relationship are cyclically applied to the multiple PDSCHs.

* * * * *